United States Patent [19]

Kiehl et al.

[11] 4,111,711

[45] Sep. 5, 1978

[54] CEMENTS AND CONCRETES WHICH CONTAIN THEM

[75] Inventors: Jean-Pierre Kiehl, Lyon; Victor Jost; Bernard Alain Clavaud, both of Bron, all of France

[73] Assignee: Societe Europeenne des Produits Refractaires, France

[21] Appl. No.: 816,753

[22] Filed: Jul. 18, 1977

[30] Foreign Application Priority Data

Jul. 22, 1976 [FR] France .................. 76 22344
May 13, 1977 [FR] France .................. 77 14717

[51] Int. Cl.$^2$ .................................................. C04B 7/02
[52] U.S. Cl. .................................... 106/97; 106/98; 106/104; 106/117
[58] Field of Search ............... 106/97, 98, 104, 64, 106/117

[56] References Cited

U.S. PATENT DOCUMENTS 3,802,894   4/1974   Prost et al. ................... 106/104

*Primary Examiner*—James Poer
*Attorney, Agent, or Firm*—Watson, Cole, Grindle & Watson

[57] ABSTRACT

The invention is directed to a cement composition comprising (1) 10–30% of an alkaline-earth mineral substance such as a slag or cement having a base of calcium aluminate or a calcined alkaline-earth oxide, (b) 14–56% of a constituent of a grain size of 100 Å to 0.1 micron selected from silica, chromium oxide, $TiO_2$, $ZrO_2$ and $Al_2O_3$, and (c) 14–56% of an inert filler of a grain size from 1 to 100 microns, the sum of (b) + (c) representing from 70 to 90% of the cement. Concrete mixtures which employ the inventive cements display superior properties.

7 Claims, No Drawings

4,111,711

CEMENTS AND CONCRETES WHICH CONTAIN THEM

BACKGROUND OF THE INVENTION

1. Field of the Invention

The present invention relates to new cement compositions as well as concretes which utilize these cements.

2. Description of the Prior Art

The cements employed at this present time are hydraulic cements which have a base of hydrated compounds of calcium silicate and aluminates of calcium. Amongst these cements, those poorest in lime are the aluminous cements of the "ciment fondu" type and the superaluminous cements such as SECAR 250, SUPER-SECAR, ALCOA CA-25, ASAHI AC.1, etc.. All of these cements nevertheless still assay more than 20% of CaO. Unfortunately in numerous cases lime is a baneful constituent (lowering of the refractory character, solubility in an acid medium, violent dehydration during a fire, and . . . ). Thus it is desirable to have available cements which are free of these disadvantages.

U. S. Pat. No. 3,802,894 describes hydraulic-setting refractory compositions which comprise by weight (a) 5-8 parts of at least one aluminous hydraulic cement, (b) 2.5-4 parts of at least one powdery refractory material selected from clay, kaolin, micronized silica, micronized magnesia, micronized chromite and micronized forsterite, (c) 0.01 to 0.30 parts of at least one dispersing agent selected from the phosphates of alkali metals, the carbonates of alkali metals, the humates of alkali metals, and (d) 86-92 parts of at least one refractory aggregate. The constituent (b) must have a particle size less than 50 microns, preferably less than 1 micron. The constituents (a), (b) and (c) constitute a cement or binder for the aggregate (d).

U.S. Pat. No. 3,060,043 describes a refractory composition having improved mechanical strength and resistance to abrasion, which comprises by weight 55-90% of a refractory aggregate (chromium ore, calcined alumina, etc.), 9-40% of a cement having a base of calcium aluminate, and 1 to 5% of volatilized silica of a particle size less than 44 microns, with more than half the silica particles being smaller than 10 microns.

The object of the invention is to provide new cements having remarkable properties, as well as concretes which contain these cements as a binders.

SUMMARY OF THE INVENTION

The cements of the present invention consist of a mixture of (1) 10 to 30% by weight of an alkaline earth mineral substance selected from steelworks slags having a base of calcium mono- or di-aluminate or of calcium silico-aluminates, aluminous cements of calcium mono-aluminate and calcium di-aluminate types silico-aluminous cements, calcium or barium silicate, and alkaline-earth oxides previously calcined at very high temperature from the group comprising magnesia, dolomite, calcium oxide and baryta; (2) 14 to 56% of a constituent having a particle size lying between 100 A and 0.1 micron selected from silica, chromium oxide, zirconia, titanium dioxide and alumina; and (3) 14 to 56% of an inert filler having a particle size lying between 1 and 100 microns, the sum of the constituents (2) and (3) representing from 70 to 90% of the weight of the cement.

The invention likewise involves concrete mixtures which consist by weight of 10 to 30% of a cement in accordance with the invention as a binder, and 70 to 90% of an aggregate.

The invention is based upon the discovery that cements and concretes having exceptional properties can be prepared by incorporating into their compositions two mineral constituents, one in the range of grain size from 1 to 100 microns and the other in the range of grain size from 100A to 0.1 micron, these two constituents being capable of being easily dispersed in water, if necessary with the addition of a dispersing agent without reacting with the water to form gels or various sols.

It seems in fact that the exceptional properties of the products of the invention result from the fact that the constituent of grain size from 100 A to 0.1 micron acts to fill a considerable portion of the voids existing between the particles of the constituent of grain size from 1 to 100 microns.

At the present time cements are preferred in which the constituent (1) is a steelworks slag of calcium aluminate, an aluminous cement of the types defined or calcined magnesia, and the constituent (2) is vitreous silica or chromium oxide. Likewise preferably the constituent (3) has a particle size between 1 and 10 microns. Likewise preferred are cements consisting of a mixture of 25 to 30% by weight of aluminous cement, 35 to 40% by weight of vitreous silica, and 35 to 40% by weight of inert filler.

The constituent (1) must have been calcined (preferably fused or sintered) at very high temperature in order to be sufficiently inert and to react only progressively with water and in any case solely when the cement or the concrete formed from this cement has been put into position, preferably by vibration. The cement of the present invention may be put into position by vibration after mixing with less than 20% of water, preferably less than 15% of water with respect to the weight of the cement. When an aluminous cement is employed of calcium mono-aluminate or calcium di-aluminate type as constituent (1), aluminous cements may be employed which are available in the trade such as "fused cement", SECAR 250, ALCOA CA.25, ASAHI AC.1. When an aluminous steelworks slag is employed as constituent (1), it may be a recovery slag containing ferruginous or titaniferous impurities. The size of particles in constituent (1) is not very critical. It is, however, preferred to employ a constituent (1) having a particle size not exceeding 100 microns, and better still of not more than 50 microns.

The constituent (2) must have a particle size lying between 100 A and 0.1 micron. This constituent (2) may be vitreous silica such as the vitreous silica obtained as a by-product in certain industrial processes such as in the reduction of zirconium silicate into zirconia or in the production of ferro-silicon (the dust from electric furnaces contains suitable silica). The constituent (2) may also be silica, chromium oxide, titanium oxide or even aluminum oxide obtained by known techniques of precipitation, drying and calcination. These oxides might also be obtained by known techniques of dissociation or hydrolysis of certain metallic compounds (such as halides) in a hot flame, in a plasma or by simple firing in a furnace. Oxides of a particle size less than 0.1 micron are also called colloidal oxides. The method of preparation of the constituent (2) does not in fact appear to be critical. What matters is that this constituent have a particle size within the range from 100 Å to 0.1 micron, can be easily dispersed in water (where necessary with the help of a dispersing agent) and does not form with water any gel or sol. Whilst an aluminous cement or a conventional Portland cement is mixed with water contents of 25 to 30%, the cements of the invention are normally mixed with a water content of less than 20%, preferably less than 15%, which after setting enables cements to be obtained which are of high density and low porosity.

The constituent (3) may be any mineral matter insensitive to hydration, capable of being obtained in the natural state or by grinding, with an average grain size of 1 to 100 microns. Preferably an inert filler will be employed with particles of a size from 1 to 10 microns because a coarser (10 to 100 microns) inert filler (3) yields less advantageous results, in particular in the production of concretes (less advantageous mechanical properties and higher water content for working up). Suitable inert fillers are, for example, oxides such as silica, alumina (alternatively calcined), magnesia, zirconia, titanium dioxide, natural minerals such as bauxite (alternatively calcined), quartzite, dolomite, magnesite, chromite, zircon, granite, basalt, or pure quartzitic sands. One may also employ calcined clay or synthetic minerals such as silicon carbide, silicon nitride, silicon oxynitride, etc. In no case must there be employed as filler, clays, bentonites or other earths which can have a colloidal action upon contact with water.

The aggregate of the concretes of the invention may consist of hard and dense rocks (for example, basalts, quartzites, granites, pebbles, etc...), electrically fused or sintered oxides (corundum, for example), premanufactured or synthetic matter (for example, calcined clay, calcined bauxite, etc.), as well as carbonaceous matter (coke, coal, anthracite, for example). The grain size of the aggregate is not very critical and will generally lie within the range normally employed in conventional concretes (less than 30 mm, preferably not more than 10 mm, the majority of the components forming the aggregate being more than 0.2 mm).

The cements and concretes of the invention may be worked up with a proportion of water distinctly less than that necessary with conventional concretes. The reduction in water content for one and the same workability is at least of the order of 25% and may reach in certain cases 50% and over.

The concretes of the invention exhibit high density, an open porosity in the raw state of less than 15%, preferably less than 10%, and a compressive strength in the raw state higher than 400 kg/cm$^2$, preferably higher than 700 kg/cm$^2$ and better still higher than 1000 kg/cm$^2$. After complete dehydration of the cement at a temperature from 800° to 1000° C. (firing), the open porosity of the concretes remains less than 15%, preferably less than 10%, and the compressive strength remains higher than 400 kg/cm$^2$, preferably higher than 700 kg/cm$^2$, and better still higher than 1000 kg/cm$^2$.

The concretes of the invention exhibit in addition after hardening, excellent resistance to fierce heating in the event of fire. Setting of the concretes is rapid. Removal of forms from the concretes obtained is possible after 24 hours. About 80% of complete setting is reached 48 hours after working up.

Apart from the essential constituents indicated above, the cements and concretes of the invention may contain one or more mineral or organic dispersant additives in order to facilitate dispersion of the various constituents and the wetting of them, in a manner in itself known. A very effective dispersant additive is sodium tripolyphosphate in the ratio from 0.01 to 0.05% by weight with respect to the weight of the concrete. The concretes of the invention are useful in both civil engineering and refractory applications, for example, for the achievement of highway surfacings which are resistant to erosion and to frost, containers for radioactive waste, lightweight reinforced concrete structures, prefabricated parts, undersea works, and fire-resistant structures.

The following non-restrictive examples are given with a view to illustrating the present invention.

EXAMPLE 1

A cement is prepared in accordance with the invention, which is useful for the preparation of civil engineering concretes, by carefully mixing the following constituents:

| | |
|---|---|
| aluminous slag of a particle size from 5 to 50 microns | 25% by weight |
| vitreous silica of a particle size from 100 A to 0.1μ | 38% by weight |
| Fontainebleau sand of a particle size of 5μ | 37% by weight |

The chemical compositions according to the fired product of the different constituents are the following in % by weight:

| | Aluminous slag | Vitreous silica | Fontainebleau sand |
|---|---|---|---|
| $SiO_2$ | 0.10 | 94.70 | 98.75 |
| $Al_2O_3$ | 57.90 | 3.65 | 1.25 |
| $Fe_2O_3$ | 0.05 | 0.15 | traces |
| $TiO_2$ | 2.60 | traces | traces |
| CaO | 35.5 | traces | 0 |
| MgO | 1.13 | traces | 0 |
| $Na_2O$ | 0.01 | 0.15 | traces |
| $K_2O$ | 0.01 | 0.05 | traces |
| $ZrO_2$ | — | 1.30 | — |
| $SO_3$ | 2.70 | — | — |
| | 100.00 | 100.00 | 100.00 |

The CaO content in the final cement is 8.87%.

In Examples 3 and 4 this cement will be called "inv.1".

EXAMPLE 2

A cement is prepared in accordance with the invention, which is useful for the preparation of refractory concretes, by carefully mixing the following constituents:
- aluminous cement of a particle size of 5 to 50 microns ... 28% by weight
- vitreous silica of a particle size from 100 Å to 0.1μ ... 36% by weight
- calcined alumina, ground to a particle size of 5μ ... 36% by weight The chemical composition according to the fired product of the different constituents is the following, in % by weight:

| | Aluminous cement | Vitreous silica | Calcined $Al_2O_3$ |
|---|---|---|---|
| $SiO_2$ | 0.25 | 94.70 | 0.05 |
| $Al_2O_3$ | 71.50 | 3.65 | 99.50 |
| $Fe_2O_3$ | 0.06 | 0.15 | traces |

-continued

|  | Aluminous cement | Vitreous silica | Calcined $Al_2O_3$ |
|---|---|---|---|
| $TiO_2$ | traces | traces | traces |
| CaO | 27.74 | traces | traces |
| MgO | 0.10 | traces | 0 |
| $Na_2O$ | 0.35 | 0.15 | 0.45 |
| $K_2O$ | traces | 0.05 | traces |
| $ZrO_2$ | — | 1.30 | — |
|  | 100.00 | 100.00 | 100.00 |

The CaO content of the final cement is 7.76%.
In Example 5 this cement will be called "INV.2".

EXAMPLE 3 a concrete is prepared in accordance with the invention, which is useful for civil engineering purposes by mixing carefully in the usual fashion the constituents indicated in the table below, which likewise gives by way of comparison the composition of a conventional concrete. The properties of the concretes obtained are likewise indicated.

| Composition in % by weight | Conventional concrete | Concrete with INV.1 cement |
|---|---|---|
| Finely crystalline granite, grain size 4/2mm | 46.5 | 46.5 |
| Granite, ungraded 2mm | 18.6 | 18.6 |
| Sand, grain size 0.15/0.05 mm | 15 | 15 |
| Portland cement 400 HTS | 20 | — |
| INV.1 cement | — | 20 |
| Water, % added with respect to the composition of dry concrete | 9.6 | 3.5 |
| Dispersing agent (sodium tripolyphosphate) | — | 0.1 |
| Properties |  |  |
| Density in the rough, dry | 2.21 | 2.49 |
| Open porosity, % | 11.1 | 4.1 |
| Compressive strength after 20 days, Kg/cm$^2$ | 400 | 1200 |
| Content of CaO capable of being hydrated, % | 13 | 1.73 |

EXAMPLE 4

A concrete is prepared in accordance with the invention, which is useful for civil engineering purposes by mixing carefully in the usual fashion the constituents indicated in the table below, which likewise gives by way of comparison the composition of a conventional concrete. The properties of the concretes obtained are likewise indicated.

| Composition in % by weight | Conventional concrete | Concrete with INV.1 cement |
|---|---|---|
| Black corundum, grain size 5/10 mm | 23 | 23 |
| Black corundum, grain size 2/4 mm | 23 | 23 |
| Black corundum, grain size 0.2/2 mm | 20 | 20 |
| Black corundum, grain size 0./0.2 mm | 20 | 20 |
| Portland cement 400 HTS | 14 | — |
| INV.1 cement | — | 14' |
| Water, % added with respect to the compositon of dry concrete | 5 | 2.5 |
| Properties |  |  |
| Density in the rough, dry | 3.10 | 3.46 |
| Open porosity, % | 16.80 | 7.1 |
| Compressive strength after 20 days, kg/cm$^2$ | 445 | 1050 |
| Content of CaO capable of being hydrated, % | 9.1 | 1.23 |

EXAMPLE 5

A refractory concrete is prepared in accordance with the invention by mixing carefully in the usual fashion the constituents indicated in the table below, which likewise gives by way of comparison the composition of a conventional concrete. The properties of the concretes obtained are likewise indicated.

| Composition by weight | Conventional concrete | Concrete with INV.2 cement |
|---|---|---|
| Calcined bauxite, grain size 4/2 mm | 30 | 30 |
| Calcined bauxite, ungraded 2 mm | 50 | 50 |
| Calcined bauxite, grain size 0/0.2 mm | 10 | 11 |
| SECAR 250 cement | 15 | — |
| INV.2 cement | — | 14 |
| Water, % added with respect to the composition of dry concrete | 12.5 | 5 |
| Properties |  |  |
| Density in the rough, dry | 2.50 | 3.00 |
| Open porosity % | 19 | 11 |
| Compressive strength after 3 days, kg/cm$^2$ | 600 | 1050 |
| After firing at 1200° C |  |  |
| Density in the rough | 2.35 | 2.90 |
| Open porosity % | 24 | 12 |
| Compressive strength, kg/cm$^2$ | 300 | 1100 |
| Content of CaO capable of being hydrated, % | 4.15 | 1.09 |

EXAMPLE VI

A cement is prepared in accordance with the invention, which is useful for the preparation of a concrete, by mixing carefully the following constituents:
- 14% by weight of an aluminous slag ground to a particle size less than 20 microns,
- 43% by weight of a vitreous silica of a particle size from 0.1 micron to 100 Å, and
- 43% by weight of calcined alumina of a particle size from 1 to 10 microns.

This cement may be put into a form by vibration with 13 to 15% of water with respect to the weight of the cement. This cement will be called INV.III cement.

The chemical compositions according to the fired product of the different constituents are the following, in % by weight:

|  | Aluminous slag | Vitreous silica | Calcined alumina |
|---|---|---|---|
| $SiO_2$ | 0.10 | 94.70 | 0.05 |
| $Al_2O_3$ | 57.90 | 3.65 | 99.5 |
| $Fe_2O_3$ | 0.05 | 0.15 | traces |
| $TiO_2$ | 2.60 | traces | traces |
| CaO | 35.5 | traces | traces |
| MgO | 1.13 | traces | 0 |
| $Na_2O$ | 0.01 | 0.15 | 0.45 |
| $K_2O$ | 0.01 | 0.05 | traces |
| $ZrO_2$ | — | 1.30 | — |
| $SO_3$ | 2.70 | — | — |
| TOTAL | 100.00 | 100.00 | 100.00 |

With this cement a concrete is prepared which is of high density, low porosity and good compressive strength by mixing carefully in the usual fashion the constituents indicated below in the proportions by weight as mentioned:

- 23% of black corundum of grain size 5/10 mm,
- 23% of black corundum of grain size 2/5 mm,
- 20% of black corundum of grain size 0.2/2 mm,
- 20% of black corundum of grain size 0.05/0.2 mm,
- 14% of INV.III cement -continued

| | |
|---|---|
| 100 | |

-Water, % added with respect to the composition of the dry concrete: 2.9.

| Properties | |
|---|---|
| Density in the rough dry state: | 3.42 |
| Open porosity: | 4.2% |
| Compressive strength: | 1500 kg/cm² after 8 days |
| After firing at 800° C: | |
| Apparent density: | 3.40 |
| Open porosity: | 5.6% |
| Compressive strength: | 1400 kg/cm² |
| After firing at 1200° C: | |
| Apparent density: | 3.40 |
| Open porosity: | 5.4% |
| Compressive strength: | 1450 kg/cm² |

EXAMPLE VII

A cement is prepared in accordance with the invention, which is useful for the preparation of a concrete, by mixing carefully the following constituents:
- 28% by weight of MgO calcined at 1650° C., of a grain size less than 50 microns,
- 36% by weight of a vitreous silica of a particle size from 0.1 micron to 100 Å,
- 36% by weight of a calcined alumina of a particle size from 1 to 10 microns.

This cement may be put into a form by vibration with 13 to 15% of water with respect to the dry weight of cement. This cement will be called INV.IV cement.

The chemical compositions according to the fired product of the different constituents are the following, in % by weight:

| | Calcined MgO | Vitreous silica | Calcined alumina |
|---|---|---|---|
| SiO₂ | 1.80 | 94.70 | 0.5 |
| Al₂O₃ | 0.40 | 3.65 | 99.50 |
| Fe₂O₃ | 0.70 | 0.15 | traces |
| TiO₂ | 0.05 | traces | traces |
| CaO | 1.25 | traces | traces |
| MgO | 95.60 | traces | 0 |
| Na₂O | 0.07 | 0.15 | 0.45 |
| K₂O | 0.03 | 0.05 | traces |
| ZrO₂ | — | 1.30 | — |
| Total | 100.00 | 100.00 | 100.00 |

With this cement a concrete is prepared which is of high density, low porosity and good compressive strength by mixing carefully in the usual fashion the constituents indicated below in the proportions by weight as mentioned:

- 23% of black corundum of grain size 5/10 mm,
- 23% of black corundum of grain size 2/5 mm,
- 20% of black corundum of grain size 0.2/2 mm,
- 20% of black corundum of grain size 0.05/0.2 mm,
- 14% of INV.IV cement

| |
|---|
| 100 |

-Water, % added with respect to the composition of the dry concrete: 3.1.

| Properties | |
|---|---|
| Density in the rough, dry: | 3.35 |
| Open porosity: | 8.80% |
| Compressive strength: | 770 kg/cm² after 8 days |
| After firing at 800° C | |
| Apparent density: | 3.35 |
| Open porosity: | 10% |
| Compressive strength: | 700 kg/cm². |
| After firing at 1200° C | |
| Apparent density: | 3.35 |
| Open porosity: | 9.5% |
| Compressive strength: | 900 kg/cm² |

EXAMPLE VIII

A cement is prepared in accordance with the invention, which is useful for the preparation of a concrete, by mixing carefully the following constituents:
- 24% by weight of an aluminous cement of a particle size from 5 to 50 microns,
- 47% by weight of chromium oxide of a particle size from 500 Å to 2500 Å,
- 29% by weight of calcined alumina ground to a particle size from 1 to 10 microns.

This cement may put into a form by vibration with 11 to 14% of water with respect to the weight of cement. This cement will be called INV.V cement.

The chemical compositions according to the fired product of the different constituents are the following, in % by weight

| | Aluminous cement | Chromium oxide | Calcined alumina |
|---|---|---|---|
| SiO₂ | 0.25 | 0.22 | 0.05 |
| Al₂O₃ | 71.50 | 0.18 | 99.5 |
| Cr₂O₃ | 0 | 98.90 | 0 |
| Fe₂O₃ | 0.06 | 0.30 | traces |
| TiO₂ | traces | 0.10 | traces |
| CaO | 27.74 | 0.14 | traces |
| MgO | 0.10 | 0.16 | 0 |
| Na₂O | 0.35 | traces | 0.45 |
| K₂O | traces | traces | traces |
| Total | 100.00 | 100.00 | 100.00 |

With this cement a concrete is prepared which is of high density, low porosity and good cold compressive strength by mixing carefully in the usual fashion the constituents indicated in the table below in the proportions by weight indicated:

- 23% of black corundum of grain size 5/10 mm,
- 23% of black corundum of grain size 2/5 mm,
- 20% of black corundum of grain size 0.2/2 mm,
- 15% of black corundum of grain size 0.05/0.2 mm,
- 19% of INV.V cement

| |
|---|
| 100 |

- Water % added with respect to the composition of the dry concrete: 3.3.

| Properties | |
|---|---|
| Density in the rough, dry: | 3.55 |
| Open porosity: | 6% |
| Compressive strength: | 800 kg/cm² |
| After firing at 800° C | |
| Apparent density: | 3.53 |
| Open porosity: | 6.9% |
| Compressive strength: | 750 kg/cm² |
| After firing at 1200° C | |
| Apparent density: | 3.49 |
| Open porosity: | 11.0% |
| Compressive strength: | 1050 kg/cm² |

EXAMPLE IX

A concrete is prepared in accordance with the invention, having the following composition by weight:

| | | |
|---|---|---|
| 23% | of black corundum of grain size 5/10 mm | |
| 23% | of black corundum of grain size 2/5 mm | aggregate |
| 20% | of black corundum of grain size 2/0.2 mm | |
| 20% | of black corundum of grain size 0.2/0.01 mm | |
| 6% | of calcined $Al_2O_3$ of a particle size from 5 to 20 microns | |
| 6% | of vitreous silica of a particle size from 100 A to 0.1 micron | binder cement |
| 2% | of Portland cement | |
| 100 | | |

The chemical analysis of the constituents is the following:

| | Black corundum | Calcined $Al_2O_3$ | Vitreous silica | Portland cement |
|---|---|---|---|---|
| $SiO_2$ | 0.50 | 0.05 | 94.70 | 22.0 |
| $Al_2O_3$ | 6.5 | 99.5 | 3.65 | 4.5 |
| $Fe_2O_3$ | 0.1 | traces | 0.15 | 1.5 |
| $TiO_2$ | 2.7 | traces | traces | 0.2 |
| CaO | traces | traces | traces | 70.8 |
| MgO | 0.2 | traces | traces | 0.8 |
| $Na_2O$ | traces | 0.45 | 0.15 | 0.1 |
| $K_2O$ | traces | traces | 0.05 | 0.1 |
| $ZrO_2$ | — | — | 1.30 | — |
| Total | 100.00 | 100.00 | 100.00 | 100.00 |

The composition so defined may be put into a form by vibration with 3.8% of water.

After setting for 15 days and stoving at 110° C, the following properties were obtained:

| Properties: | |
|---|---|
| Apparent density: | 3.31 |
| Open porosity: | 9.3% |
| Compressive strength: | 510 kg/cm² |
| After firing at 800° C: | |
| Apparent density: | 3.28 |
| Open porosity: | 12.6% |
| Compressive strength: | 695 kg/cm² |
| After firing at 1200° C: | |
| Apparent density: | 3.27 |
| Open porosity: | 13.1% |
| Compressive strength: | 740 kg/cm² |

By way of comparison, if the vitreous silica as defined is replaced by a micronized silica of a particle size from 1 micron to 10 microns, the amount of water necessary for putting into a form by vibration is 6%.

After setting for 15 days and stoving at 100° C, the following properties are obtained:

| Properties: | |
|---|---|
| Apparent density: | 3.17 |
| Open porosity: | 16.5% |
| Compressive strength: | 80 kg/cm² |
| After firing at 1200° C: | |
| Apparent density: | 3.23 |
| Open porosity: | 15.2% |
| Compressive strength: | 260 kg/cm² |

The results show well the critical importance of the use of a constituent (2) exhibiting a particle size within the range defined.

EXAMPLE X

A concrete is prepared in accordance with the invention, having the following composition by weight:

| | | |
|---|---|---|
| 41% | of calcined anthracite of grain size 2/4 mm | |
| 16% | of calcined anthracite, ungraded 2 mm | aggregate |
| 13% | of calcined anthracite of grain size 0.5/0.1 mm | |
| 11% | of Fontainebleau sand of a particle size of 5 microns | |
| 11% | of vitreous silica, of a particle size from 100 A to 0.1 microns | binder cement |
| 8% | of aluminous slag of a particle size from 5 to 50 microns | |
| 100 | | |

The characteristics of the calcined anthracite are the following:

| | |
|---|---|
| Carbon content | >94% |
| Ash content: | 5.1% |
| Apparent density: | 1.68 |
| Open porosity: | 4.42% |

The chemical analysis of the other constituents is the following:

| | Aluminous slag | Vitreous silica | Fontainebleau sand |
|---|---|---|---|
| $SiO_2$ | 0.10 | 94.70 | 98.75 |
| $Al_2O_3$ | 57.90 | 3.65 | 1.25 |
| $Fe_2O_3$ | 0.05 | 0.15 | traces |
| $TiO_2$ | 2.60 | traces | traces |
| CaO | 35.5 | traces | 0 |
| MgO | 1.13 | traces | 0 |
| $Na_2O$ | 0.01 | 0.15 | traces |
| $K_2O$ | 0.01 | 0.05 | traces |
| $ZrO_2$ | — | 1.30 | — |
| $SO_3$ | 2.70 | — | — |
| Total | 100.00 | 100.00 | 100.00 |

The composition so defined may be put into a form by vibration with 5.8% of water.

After setting for 8 days and stoving at 110° C., the following properties were obtained:

| | |
|---|---|
| Apparent density: | 1.77 |
| Open porosity: | 7.3% |
| Compressive strength: | 620 kg/cm² |
| Permeability: | <0.2 np |
| After firing at 800° C: | |
| Apparent density: | 1.75 |
| Open porosity: | 9.0% |
| Compressive strength: | 650 kg/cm² |
| Permeability: | <0.2 np |
| After firing at 1200° C: | |
| Apparent density: | 1.75 |
| Open porosity: | 10.5% |
| Compressive strength: | 780 kg/cm² |
| Permeability: | >0.2 np |

It goes without saying that the embodiments described are only examples and that it would be possible to modify them, especially by substitution of equivalent techniques, without thereby departing from the scope of the invention.

We claim

1. A cement consisting essentially of a mixture of 10 to 30% by weight of a first ingredient, 14 to 56% by weight of a second ingredient, and 14 to 56% by weight of a third ingredient wherein said second and third ingredients represent from 70 to 90% of the weight of the cement, and wherein said first ingredient is at least one alkaline-earth mineral substance selected from the group consisting of calcium monoaluminate steelworks slag, calcium dialuminate steelworks slag, calcium silico-aluminate steelworks slag, calcium monoaluminate cement, calcium dialuminate cement, silicoaluminous cement, calcium silicate, barium silicate and an alkaline-earth oxide which has been calcined at very high temperature and has been selected from the sub-group consisting of magnesia, dolomite, calcium oxide and baryta; said second ingredient is at least one substance having a particle size lying between 100 A and 0.1 micron selected from the group consisting of silica, chromium oxide, titanium dioxide, zirconia and alumina; and said third ingredient is an inert filler having a particle size lying between 1 and 100 microns.

2. A cement according to claim 1, in which the third ingredient has a particle size lying between 1 and 10 microns.

3. A cement according to claim 1, in which the first ingredient is selected from the group consisting of calcium aluminate slags, calcium aluminate cements, and calcined magnesia, and the second ingredient is selected from the group consisting of silica and chromium oxide.

4. A cement according to claim 1, comprising essentially a mixture of 25–30% by weight of a said first ingredient selected from the group consisting of calcium aluminate slags and calcium aluminate cements, 35 to 40% by weight of silica as said second ingredient and 35 to 40% by weight of inert filler as said third ingredient.

5. A concrete comprising essentially by weight 10 to 30% of a cement as defined in claim 1, and 70 to 90% of an aggregate.

6. A concrete according to claim 5, exhibiting an open porosity less than 15% after complete dehydration of the cement at a temperature of 800°–1000° C.

7. A concrete according to claim 5, exhibiting an open porosity less than 10% after complete dehydration of the cement at a temperature of 800°–1000° C.

* * * * *